United States Patent [19]

Bellamy

[11] 4,441,030
[45] Apr. 3, 1984

[54] ENERGY CONVERSION APPARATUS

[75] Inventor: Norman W. Bellamy, Coventry, England

[73] Assignee: Sea Energy Associates, Limited, England

[21] Appl. No.: 405,453

[22] Filed: Aug. 5, 1982

[30] Foreign Application Priority Data

Aug. 5, 1981 [GB] United Kingdom ............... 8123908

[51] Int. Cl.³ .......................................... F03B 13/12
[52] U.S. Cl. ..................................... 290/53; 60/499; 417/100; 417/330
[58] Field of Search ........................ 290/4 D, 42, 53; 417/100, 229, 330, 331; 60/497, 499, 501

[56] References Cited

U.S. PATENT DOCUMENTS 3,389,888 6/1968 Edwards ............................ 417/330
4,123,667 10/1978 Decker ............................... 417/330

Primary Examiner—J. V. Truhe
Assistant Examiner—Shelley Wade
Attorney, Agent, or Firm—David A. Jackson; Daniel H. Bobis

[57] ABSTRACT

A wave energy conversion system is disclosed and comprises a spine and a plurality of wave driven pump units each comprising a pillow shaped flexible bag arranged with its length direction horizontal and mounted on the spine so that the water in which the system is located flows to both sides of the bag so that in use the bag is kept out of abrading contact with the spine. The lower edges of the bags are attached to the spine and the upper edge of each bag has a common outlet/inlet passage through which air is pumped back and forth by the bag collapsing and expanding under the influence of the waves. The common passage is at one top corner of the bag and at the other top corner is a dummy passage which enables the bag to be fabricated in such a manner that the corners are not stressed significantly in use. Also, a common pipe can be used to define the common passage of one bag and the dummy passage of the adjacent bag. The pumped fluid from each bag is passed through a module which is located outside the spine and therefore can be easily removed for repair, the module including a uni-directional turbine for converting the fluid energy into shaft/electrical energy.

14 Claims, 6 Drawing Figures

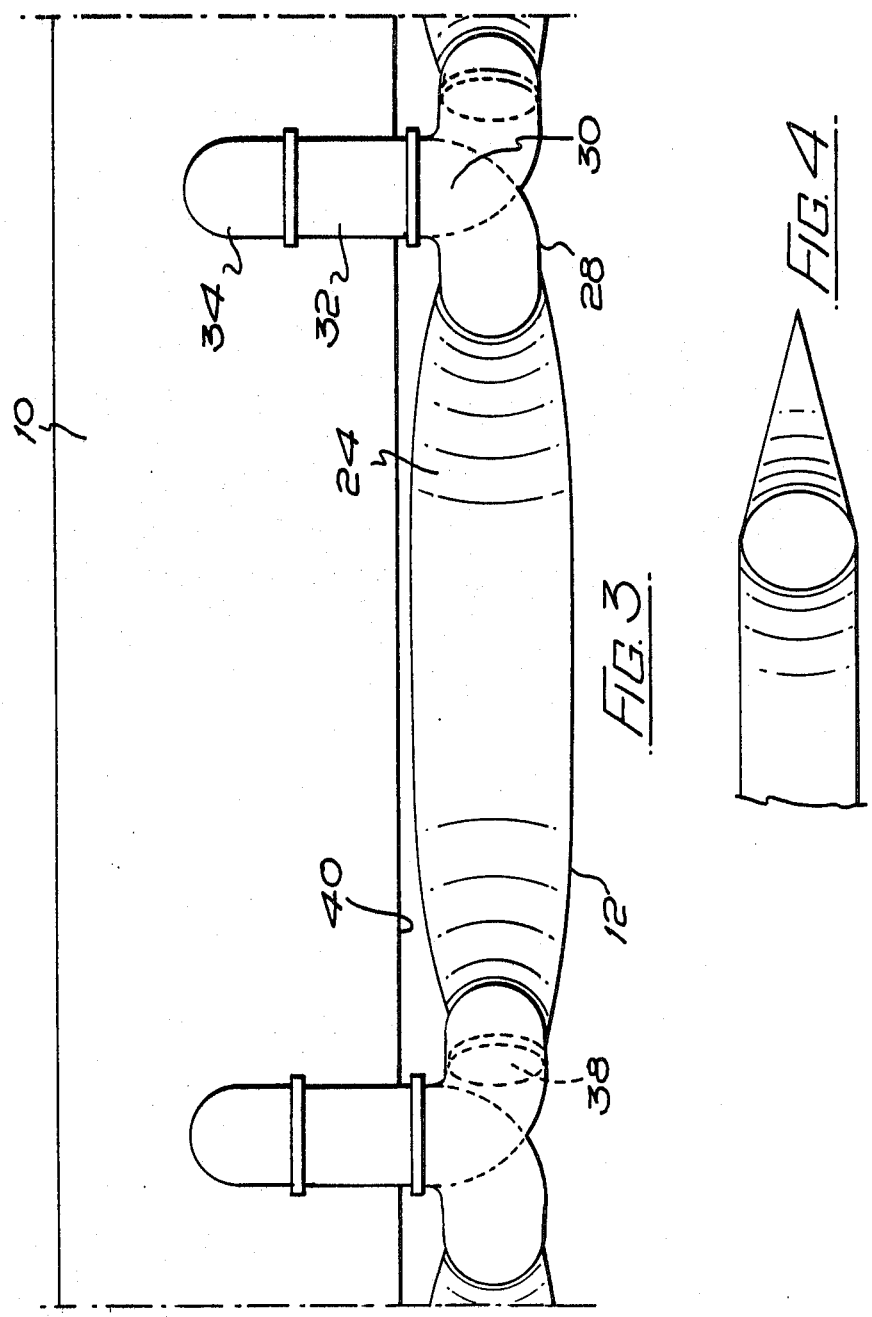

ENERGY CONVERSION APPARATUS

This invention relates to energy conversion apparatus, suitable for conversion of the energy in waves in a body of liquid into a more readily usable form. In particular, the invention concerns the utilisation of a flexible bag device, designed in particular fashion to give good energy conversion characteristics.

The flexible bag essentially is located to one side of a reaction member, herein referred to as a spine, against which wave forces are exerted. The flexible bag is located between the reaction member and the oncoming waves so that it will be cyclically compressed and relaxed. Utilisation is made of this cyclical comprising and relaxation in order to pump fluid, such as air, within the bag in order to drive a prime mover, such as a turbine.

The present invention is concerned with the design of the bag in such a system, and although specifically single bags are described hereinafter, in a practical arrangement, the spine will carry a plurality of said bags with the bags fluidically interconnected.

The design of bag and its mounting on the reaction member is, as can be appreciated, extremely important and critical. As the bag will be required to flex many times, and in all types of conditions, it is important that the bag design avoids high stress areas, and also that there should be as little as possible abrading contact between the flexible bag and the spine, as the latter will probably constructed of concrete.

In accordance with the invention, a flexible bag is provided for the energy conversion arrangement indicated herein, wherein the bag is designed to be attached relative to the spine at or along the bottom edge thereof, from which extend front and rear sides of the bag, the front side being for facing the oncoming waves, and the rear side being for location in opposition to the spine, the rear side being sufficiently free of the spine so that in use water of the body of water can locate behind the rear side and the spine surface keeping the rear surface out of contact with the spine, so that by compression of the bag by an oncoming wave meeting the front surface, the fluid in the bag is forced upwardly by virtue of the reaction of the volume of water between the rear side and the spine, which volume increases in height rather than being expelled from the bag edges, and the bag has coupling passage means at the top for the expulsion of fluid therefrom, and for the intake of fluid thereinto, so that displacement of the fluid can be used to drive a suitable prime mover.

Preferably, there is a common passageway from the top end of the flexible bag which serves as an inlet and an outlet so that the passageway can couple with a conduit containing a uni-directional self-rectifying turbine, such as is disclosed in our co-pending application No. 8216727, for the provision of shaft energy by virtue of the forward and rearward flow of fluid through the conduit by virtue of the compressing and relaxing of the flexible bag due to the wave forces.

Preferably, the single passageway is located at a position such that the bag experiences minimum folding during compression and relaxation, and to this end the passageway is at one of the top corners of the bag with a dummy passageway at the other corner, whereby the need to fabricate the top corners of flexible bag material is reversed, which fabricated top corners are areas of potential failure in use because the material at such corners folds or tends to fold in use.

The inlet and outlet passageway may be defined by a conduit which leads to a module comprising a sleeve containing a uni-directional turbine, the sleeve being coupled to a manifold inside the spinde. When there are two of said passageways, the second and dummy passageway may be defined by a rigid, but blanked off conduit. The bag corners are fabricated to the shape of the conduits, which will be round in section whereby folding of the bag material in use can be avoided.

The said module and bag may be located outside the spine and may be removable for repair and replacement.

Preferably, there will be a plurality of said bags, each with its own module and each communicating through its module with the second manifold.

Each bag preferably comprises a front panel, a rear panel, the front and rear panels being connected together along the bottom edge of the bag, sides of semi-conical shape and a top of semi-cylindrical shape, the passageways being connected with the bag at the corners and the tops of the sides and the ends of the top being wrapped around the conduits forming the passageway. The said conduits may be rigid or may be of the same flexible material as the bag.

In an alternative arrangement, the flexible bag may be held in suspended position by being mounted on a support arrangement connected to the top corners of the bag and mounted on the spine. The support arrangement may be constructed so as to be adjustable and by suitable adjustment, it may be arranged that the bag rear side is kept out of contact with the spine during operation, for normal wave conditions.

In the alternative arrangement the bag may be generally pillow-shaped, with one of the longer edges forming the said bottom edge and as regards the longer edge forming the upper edge, in the centre of this edge there may be an integral common inlet and outlet constructed of flexible material of the same material as the front and rear sides of the bag.

Embodiments of the present invention will now be described, by way of example, with reference to the accompanying drawings, wherein:

FIGS. 2, 3 and 4 are respectively; a sectional side elevation taken on the Line A—A of FIG. 1; a plan view of the section of apparatus shown in FIG. 1; and a fragmentary sectional view taken on the line B—B of FIG. 1;

Figure 1:
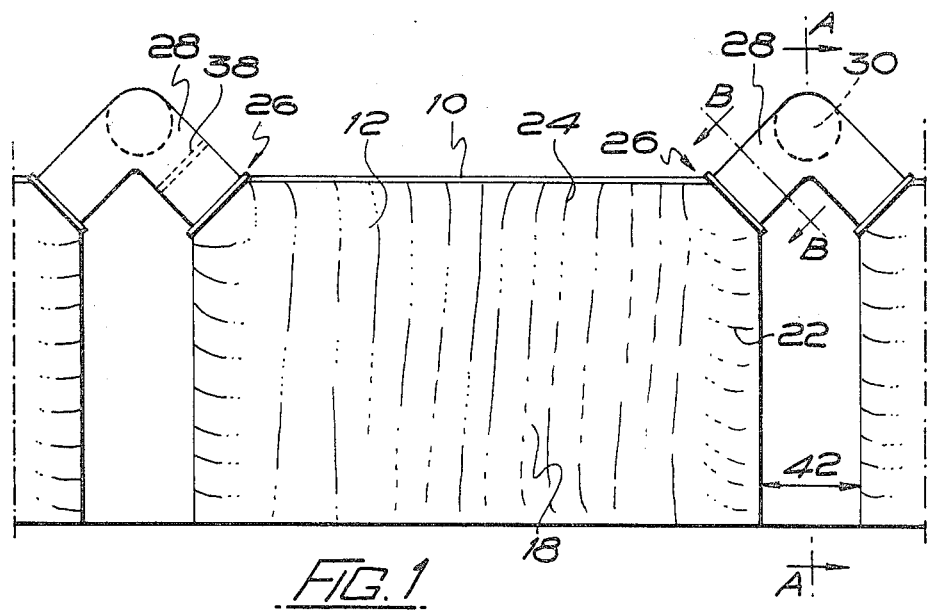
FIG. 1 is a side view of a flexible bag and spine section of an energy conversion apparatus.

Referring to FIGS. 1 to 4 of the drawings, an elongated hollow concrete member 10, hereinafter referred to as a "spine" forms a support structure for a number of flexible bags 12, of which only one is shown in the drawings, each being filled with air. The bags are generally pillow shaped, with the longer dimension running in the direction of the length of the spine, and the lower edge 14 of each bag is connected to the lower edge 16 of the spine 10 as shown clearly in FIG. 2. Each bag 12 comprises a front panel 18 and a rear panel 20 connected by semi-conical sides 22 and a semi-cylindrical top 24, thereby to form an enclosure for the pumping fluid, which in this case will be air. The said panels may be sewn or otherwise connected together or alternatively the whole bag may be moulded in one piece.

This embodiment of the invention is advantageous in the design of the corners 26 of the bag 12, and their connections to rigid conduits 28. Conduits 28 are of L-shape in side view as shown in FIG. 1, and have an outlet 30 which is coupled to a turbine generator module 32 containing a uni-directional self-rectifying turbine, for example the type disclosed in our co-pending British Patent application No. 8216272 and from the module 32, an elbow pipe 34 connects to a cavity 36 in the spine 10. The said cavity 36 in fact forms a common manifold hydrodynamically coupling the interiors of all of the bags 12, through the associated turbine generator modules 32.

Because in the region 26 of the corners of the bag 12 which are connected to the rigid conduits 28, a semiconical side meets a semi-cylindrical end 24, by appropriate positioning of the conduit and by dimensioning of same, the said side 22 and semi-cylindrical top 24 can be wrapped round the conduit 28 with minimum stress on the flexible fabric of the bag 12 so that in use, during the flexing of the bag, there will be no creasing or folding of the flexible material in the region 26 of the corners, which is usually a problem with bag design. Suitably, the conduit 28 will meet the bag corner at an angle intersecting the semi-conical and semi-cylindrical side and top 22, 24, in a section which is a semi-circle, or is very near a semi-circle so that the said side and top of the bag will wrap round the conduit 28, which will be a circular section of the same diameter, with minimum or no stress. If there is any tendency of the corner to crease in use of the apparatus, then such tendency can be counteracted by the flexibility of the fabric by slightly stretching the bag corner around the rigid conduit.

As each bag 12 is to be associated with its own turbine and generator module 32, then one of the outlets at one of the corners will in fact be a dummy and will be blanked off, for example by means of a blanking plate 38.

Figure 2:
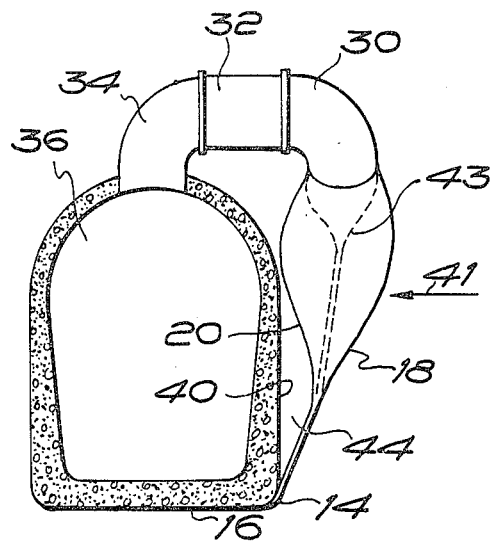
Figure 5:
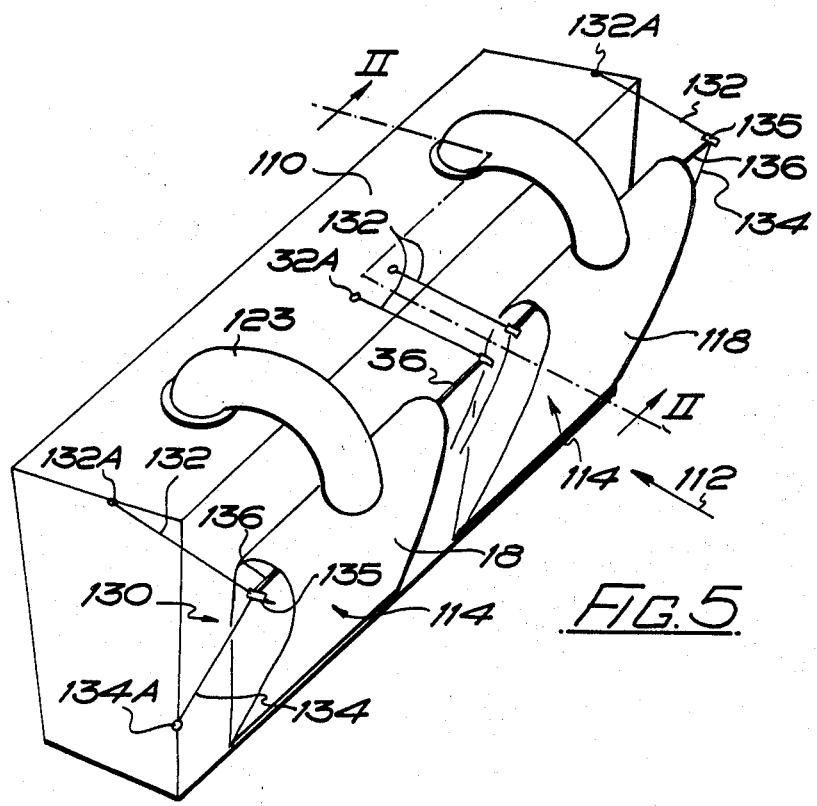
FIG. 5 is a diagrammatic perspective elevation of a section of spine showing two flexible bags each according to the invention, and each mounted on a spine according to the invention.
Figure 6:
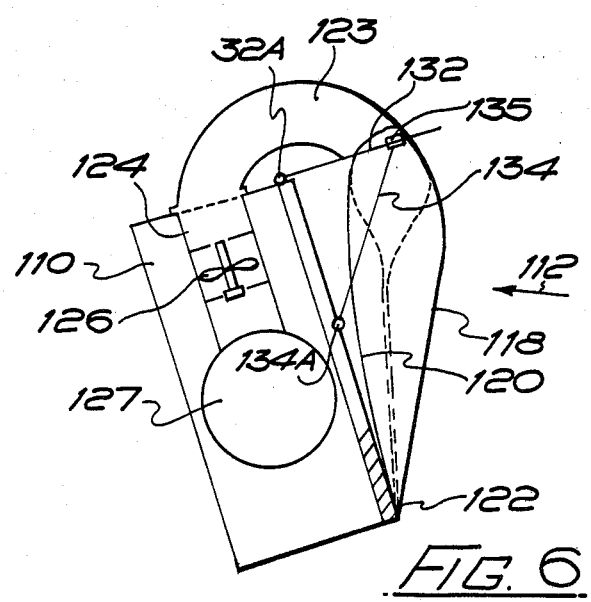
FIG. 6 is a diagrammatic sectional elevation of one of the flexible bags shown in FIG. 5, the section being taken on the line II—II in FIG. 5.

The said conduits 28 at the corners of the bag 12 serve a number of functions including that they also serve to support the flexible bag 12 outwardly of the spine as shown in FIG. 2, so that there will be no abrading contact between the rear 20 of the bag and the spine surface 40 as the bag compresses and expands in use, and furthermore the utilisation of the rigid support conduits enables the utilisation of turbine/generator modules 32 which can be located outside the spine 10, (in contradistinction to the embodiment of FIGS. 5 and 6, and therefore can be easily removed and replaced, simplifying maintenance of the apparatus considerably. Heretofore, it is always being thought necessary to embody the prime mover and energy conversion unit such as the generator and turbine inside the spine for protective purposes.

Although it is desirable to use rigid conduits for coupling to the corners of the bag, it is to be stressed that this is not necessary and it is possible to use flexible conduits. Similar advantageous results are achieved using flexible conduits in that creasing of the bag is limited or prevented at the corners by providing conduits thereat.

In the use, the apparatus will of course be located in a body of liquid in which there are waves, the apparatus being located so that the waves approach in the direction indicated in FIG. 2 by arrow 41. The bags 12 are filled with air at a predetermined pressure in order that they will take up a particular shape, as shown in FIG. 2. Because the bags are spaced by an interval 42 as shown in FIG. 1, the water of the body of liquid gets behind the bag in the region 44 shown in FIG. 2, and when an oncoming wave meets a bag, it flattens as indicated by dotted lines 43 in FIG. 2, thereby forcing the air out of the bag and out of the outlet 28, through the associated turbine generator module and into the interior of the spine. The movement of the air through the turbine generator module 32 drives the turbine, which in turn drives the generator to produce electrical energy. When the wave recedes, and the bag once more takes up the shape shown in full lines in FIG. 2, air is induced back or forced (by other bags exhausting into the spine), into the bag, and again the turbine is driven, in the same direction as it is uni-directional, continuing the output of electrical energy.

The bags exhaust into and draw from the interior of the spine cyclically in sympathy with the wave forces, and as the waves will inevitably be out of phase along the length of the spine, at any one time some bags will be charging air into the manifold, whilst others will be drawing air therefrom, but the net result will be aggregated electrical energy from all modules 32.

FIG. 4 shows a view in the direction of the arrows B—B, to indicate how the bag side and top wrap round the conduit in a minimum stress fashion.

A considerable advantage of this embodiment of the invention is that each bag can be constructed from flat sheets of flexible material and it is not necessary to form any pre-formed curved shapes. Clearly the semi-cylindrical top and the semi-conical sides can be constructed from flat sheet material in addition to the front and rear of the bag. However, in larger versions of the bag it may be desireable to avoid joins in the material and mould the bags in one piece using fibre reinforced fabric.

The conduits may be of steel and form the sole upper anchor points for the bag, the holding taking place at the points of least stress on the bag during an operational cycle.

Referring now to FIGS. 5 and 6 the drawings, in FIG. 1 there is shown a section of an elongated spine 110 which is for positioning in a body of water such as the sea. The spine in a practical example, may be of the order of 15 meters deep by 10 meters wide, and may be of a nature to be buoyantly supported by the sea, or it may be mounted in fixed position by a suitable supporting means extending from the sea bed. The spine is shown as being generally rectangular, with the longer sides vertical, and mounted on one of the vertical faces, the face which looks into the oncoming waves whose direction is indicated by arrow 112, are mounted a plurality of independent flexible bags 114, each shaped generally like a pillow and comprising (FIG. 6) a front face 18 and rear face 120. The bottom edge 122 of the bag is firmly connected to the lower portion of the spine as shown, whilst the upper edge has centrally thereof and integral therewith a single outlet/inlet pipe 123 which couples to a conduit 124 inside the spine, such conduit 124 containing a self-rectifying uni-directional turbine 126 which may be of a nature as set forth in our co-pending application No. Conduit 126 connects with a common manifold 127. The bag is of a flexible material such as a reinforced rubber, and the pipe 23 is integral therewith and of the same material.

The principle of operation is quite simple and is described with reference to FIGS. 1 to 4 in that as the waves meet the flexible bags 114, they deflect same compressing the bag and forcing the fluid contained therein, which will normally be air, from the interior of the bag through pipe 123, conduit 124 and past turbine 126 which is driven to provide shaft energy, and that shaft energy can be converted to electrical energy by suitable electrical conversion means connected to the turbine shaft. As the wave recedes, air is drawn or is forced back (by virtue of the hydraulic coupling of all the bags) through the turbine 126, which continues its rotation in the same direction because of its design, from the common manifold 127 inside the spine which links all of the flexible bags.

This embodiment also provides a novel bag design and mounting.

It will be noticed that the bag 114 is connected to the spine only at or along the bottom edge, and the rear side 120 at worst merely rests against the spine surface, and at best is kept out of contact with the spine surface throughout operation by suitable positioning of the support arrangement 130 for the top edge of the bag, such support arrangement comprising support struts 132 and 134 which may arrangement comprising support struts 132 and 134 which are pivotally mounted at points 132A, 134A on the spine and which may arrangement comprising support struts 32 and 34 which may be adjustable in length to position the top edge of the bag 114 in the static position outwardly of the reaction face of the spine, such struts supporting rods 36 attached to the bag top corners. The rods 132 and 134 are connected by a slide block connection 135.

It has been found in testing a model of this embodiment that water locates behind the rear side 120 of the bag and in front of the spine face, and when a oncoming wave meets the front side 118 of the bag 114, the effect is that the front and rear sides of the bag are pushed together by volumes of water on opposite sides, and the volume of water between the spine and rear face acts essentially as standing water and its level simply increases and falls as the bag expands and contracts.

FIG. 6 shows in dotted lines the position which the bag takes up under maximum compression, whilst the full line position shows the bag in the most relaxed condition.

In setting up the apparatus for operation, the interior of the common conduit 127 is pressurised as described in relation to the FIG. 1 arrangement, so that the bags are also pressurised to a pre-set level which matches the most common wave spectrum which will be expected of water in which the apparatus will be located.

I claim:

1. A flexible bag for the energy conversion arrangement indicated herein, wherein the bag is designed to be attached relative to the spine at or along the bottom edge thereof, from which extend front and rear sides of the bag, the front side being for facing the oncoming waves, and the rear side being for location in opposition to the spine, the rear side being sufficiently free of the spine so that in use water of the body of water can locate behind the rear side and the spine surface keeping the rear surface out of contact with the spine, so that by compression of the bag by an oncoming wave meeting the front surface, the fluid in the bag is forced upwardly by virtue of the reaction of the volume of water between the rear side and the spine, which volume increases in height rather than being expelled from the bag edges, and the bag has coupling passage means at the top for the expulsion of fluid therefrom, and for the intake of fluid thereinto, so that displacement of the fluid can be used to drive a suitable prime mover.

2. A flexible bag according to claim 1, wherein there is a common passageway from the top end of the flexible bag which serves as an inlet and an outlet so that the passageway can couple with a conduit containing a unidirectional turbine, for the provision of shaft energy by virtue of the forward and rearward flow of fluid through the conduit by virtue of the compressing and relaxing of the flexible bag due to the wave forces.

3. A flexible bag according to claim 2, wherein the bag is rectangular, pillow shaped, and is for use with a longer direction horizontal.

4. A flexible bag according to claim 3, wherein said common passageway is at one of the upper corners of the bag.

5. A flexible bag according to claim 4, wherein there is a dummy passageway at the other upper corner of the bag.

6. A flexible bag according to claim 4 or 5, wherein the bag is made up of front and rear panels joined together at the lower side of the bag and joined at the sides of semi-conical panels having the apices at the lower side of the bag, and by a semi-cylindrical panel at the upper side of the bag, the said common passageway or each of the common passageway and dummy passageway being a rigid pipe around which an end of the semi-cylindrical panel and the adjacent large diameter end of the semi-conical panel is wrapped.

7. An energy conversion system comprising a reaction spine, and one or more flexible bags according to any one of claims 1–4 or 5 mounted thereon, wherein the or each bag is mounted on the side of the spine so as to come under the influence of the waves in the body of liquid in which the system is located in including conversion means for converting the displacement of fluid the displacement of fluid form and into the or each bag into energy in a more readily useable form.

8. An energy conversion system comprising a reaction spine, and one or more flexible bags according to claim 6 mounted thereon, wherein the or each bag is mounted on the side of the spine so as to come under the influence of the waves in the body of liquid in which the system is located in including conversion means for converting the displacement of fluid the displacement of fluid form and into the or each bag into energy in a more readily useable form.

9. A system according to claim 7, wherein the conversion means includes a replaceable module for the or one for each bag located outside the spine and connected to the common passageway or the respective common passageways or the bag or bags.

10. A system according to claim 8, wherein the conversion means includes a replaceable module for the or one for each bag located outside the spine and connected to the common passageway or the respective common passageways or the bag or bags.

11. A system according to claim 9, wherein the or each module includes a uni-directional turbine contained in a conduit of which one end is connected to the common passageway of the associated bag and the other end is coupled to a chamber inside the spine, which chamber when there are more than one bag is common to all bags.

12. A system according to claim 10, wherein the or each module includes a uni-directional turbine contained in a conduit of which one end is connected to the common passageway of the associated bag and the other end is coupled to a chamber inside the spine, which chamber when there are more than one bag is common to all bags.

13. A system according to claim 10, wherein there are two or more bags and as regards adjacent bags, the common passageway of one bag is adjacent the dummy passageway of the other bag and are defined by a common L-shaped pipe containing a blanking plate to make a section of the pipe the dummy passageway and the other section of the pipe is open to the associated module.

14. A system according to claim 12, wherein there are two or more bags and as regards adjacent bags, the common passageway of one bag is adjacent the dummy passageway of the other bag and are defined by a common L-shaped pipe containing a blanking plate to make a section of the pipe the dummy passageway and the other section of the pipe is open to the associated module.

* * * * *